June 17, 1930. H. S. CHRISTOPHERSEN 1,763,639
TIRE DEFLATION SIGNAL
Filed Aug. 8, 1929
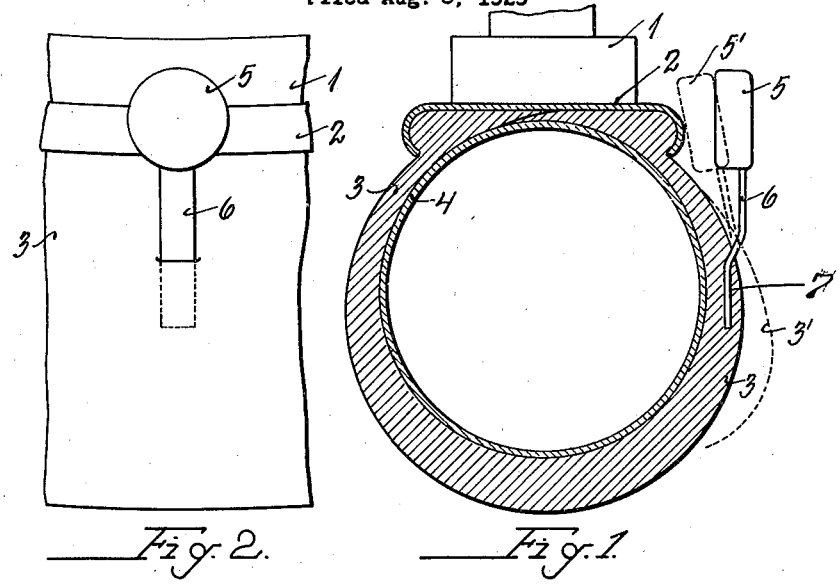
Fig. 2.   Fig. 1.
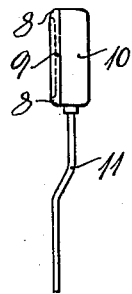 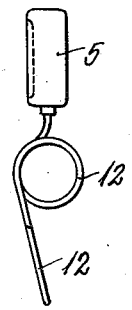 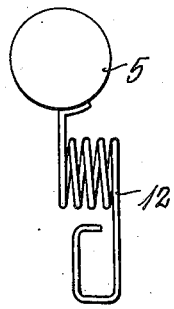
Fig. 3.   Fig. 4.   Fig. 5.
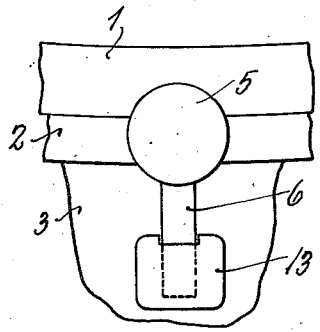 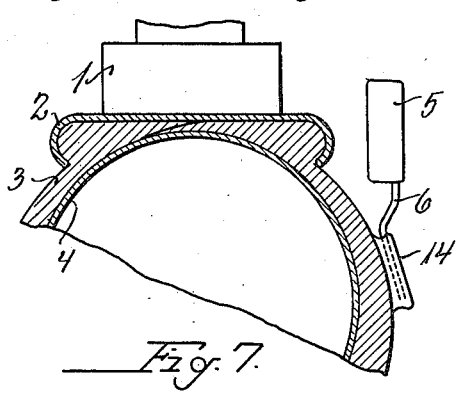
Fig. 6.   Fig. 7.
INVENTOR
H. S. Christophersen,
By Watson, Coit, Morse & Grindle
ATTY'S.

Patented June 17, 1930

1,763,639

UNITED STATES PATENT OFFICE

HAGBART SYLVESTER CHRISTOPHERSEN, OF ODENSE, DENMARK

TIRE DEFLATION SIGNAL

Application filed August 8, 1929, Serial No. 384,399, and in Denmark November 30, 1928.

Several devices are known by means of which the driver of automobiles during driving is notified in good time about any existing injury to one or more of the pneumatic tires resulting in a slow escape of their content of air, so that the vehicle may be stopped in time and the defect remedied before the pneumatic tire has been damaged by continued driving on the same without sufficient filling of air.

A common feature of the heretofore proposed arrangements of this nature has been that they have consisted of a mechanism which is fixed on the felly of the wheel or one of the spokes, and which has a movable member by means of which the sound producing device caused to act by the said movable member being actuated either by the road surface or by the pneumatic tire in direct consequence of the latter altering its shape (becoming alternately flatter and wider) when air escapes from the same. The known devices of this nature suffer from several drawbacks, among which the very serious one that the attachment of the mechanism to the wheel felly or spoke cannot be effected by universal means suitable in all cases, as the constructional details of the wheels (felly and spokes or disc) differ so exceedingly much for the various types of carriages. This fact in combination with the circumstance that the proposed mechanisms have all been more or less complicated and difficult to attach and to keep in reliable order and to adjust into their proper working position have caused that such devices have not heretofore come into universal use in spite of the actually great need of a reliable alarm device for the purpose here referred to.

The present invention solves the problem in question by producing for each revolution of the wheel, when a certain deficiency of air occurs, an audible rap against the wheel felly (or, if desired, a spoke or some other part of the wheel proper) by a body which in contradistinction to the heretofore known devices is, itself, a sonorous sound producing body, supported by the pneumatic tire itself. Hereby all the difficulties heretofore appearing by the attachment of the mechanism to fellies or spokes etc. of widely varying construction are immediately removed, without the attachment of the apparatus to pneumatic tires of various types introducing any new difficulties, which will appear from the following.

The accompanying drawing shows, as examples of how the idea underlying the present invention may be carried out, some few slightly differing constructions of such an alarm device, and Figs. 1 and 2 show one of the constructions, in cross-sectional view of the tire and in side elevation, respectively, while Fig. 3 shows a special construction of the sound-producing body, Figs. 4 and 5 a further modified construction of said body, in front and side elevation, and finally Figs. 6 and 7 two views corresponding to Figs. 2 and 1, respectively, each with a modified attaching device for the sound-producing body.

1 is the wheel felly with a metal rim 2 attached thereto and 3 the cover inside of which the inner tube 4 is disposed. The sound-producing body is supposed, in the figure, to be formed by a small shallow metal capsule 5 to which an arm 6 of resilient material is attached, the free end of said arm being inserted through an opening 7, in the outer surface of the cover, into a cavity in the wall of the same corresponding in shape to the arm 6, so that the latter, simply by being inserted into the said cavity, attains a secure position on the cover, which position will be further secured by the centrifugal force during the rotation of the wheel. When an essential loss of air occurs by injury to the tire each point of the latter will gradually become flattened during the rotation, when it reaches the road surface, as indicated by the line 3′ in Fig. 1. Hereby the sound-producing body 5 will be forced inward towards the felly or a spoke according to its position and once for each revolution of the wheel, until it assumes about the position indicated by 5′ in Fig. 1, and when further actuated it will strike the felly (or other part of the wheel) with a rap or blow while passing its lowest position during the rotation of the wheel. This rapping will also be influenced by the centrifugal force acting on the body 5 while sloping towards the plane of the wheel as shown.

Experiments have shown that by suitable selection of shape and material for this sound-producing body a very sharp and penetrating ringing sound may hereby be produced, which is easily heard by the driver, even in a closed carriage. Especially a sound-producing body formed as a hollow, circular or square capsule and with a depression in the bottom, as shown in Fig. 3, has proved suitable, because by this shape an edge 8 is formed which raps sharply against the felly. In the construction shown in Fig. 3 the body is otherwise supposed to be formed by spinning or pressing of a thin metal plate into the shape of two open cups 9 and 10 tightly pressed into one another and having soldered to one of them a preferably somewhat resilient metallic arm 11 extending therefrom. By this arrangement the body is very cheap and easy to produce and very effective as a sound producing device.

In Figs. 4 and 5 a somewhat modified arrangement is shown where a steel wire 12 coiled as a spring is used as holder for a capsule-shaped sound-producing body 5, the manner of operation of the said holder being otherwise the same as that of the device shown in Figs. 1-3 as will be readily understood from the drawing.

By the use of a resilient holder arm 11 or 12 as shown in Figs. 1-5 the apparatus will be especially sensitive. If a lower degree of sensitiveness is desired the holder arm 11 or 12 may very well be made less resilient, or stiff.

In Fig. 6 the cavity in which the body 5 is held by means of the arm 11 or 12 is supposed to be produced by applying to the outer face of the tire a patch 13 of canvas smeared with solution or the like, if desired covered with vulcanized rubber. By this arrangement as well as by the arrangement shown in Figs. 1 and 2 with a cavity in the cover itself the cavity can be made open, if desired, also at its rear end, so that the opening may thus easily be cleaned for dust or the like.

In Fig. 7 the holder arm of the sound producing body is inserted in a hole in a projection 14, for instance of rubber attached on the outer surface of the cover. The holder may also be attached around the circumference of such a projection.

A bell-shaped cup, or generally bodies of other shapes than those shown on the drawing by way of example may also be used as sound-producing body, but experience has shown that a closed capsule, as shown on the drawing, by a very small expenditure of material will give a very strong body and a powerful alarm by the body striking the felly.

The attachment and removal of the alarm body is exceedingly simple and may be effected for wheels and tires of any type whatever, without the cover being thereby exposed to the slightest danger. In this connection it must be remembered that the holder for the sound-producing body remains immovable relatively to the cover and, therefore, does not produce any wear on the same. Another advantage is that the device occupies extremely little space and requires practically no attention of any kind, so that it may be disposed on the inner side of the wheel where it will be practically invisible and not interfere with other parts of the car, for instance the brake drums.

It will be appreciated that the member 5 may be so disposed as to contact with the usual wheel rim, felly, or spoke as desired, these component parts or any of them being obviously included in the term "vehicle wheel" as used herein.

Having now particularly described and ascertained the nature of my said invention and in what manner the same is to be performed I declare that what I claim is:—

1. A device for indicating deflation of pneumatic tires on vehicle wheels comprising means carried by the tire wall and extending to a point slightly spaced from and alongside a portion of the wheel when the tire is properly inflated, whereby the bending of the tire wall when the tire is deflated will cause the said means to strike the wheel to give out an audible signal.

2. In apparatus of the class described, the combination with a pneumatic tire for a vehicle wheel having a projection on the side wall thereof, of means mounted in said projection and extending inwardly therefrom to a point slightly spaced from and alongside a portion of a vehicle wheel on which the tire may be mounted, whereby the bending of the tire wall when the tire is deflated will cause the said means to strike the wheel to give out an audible signal.

3. The combination recited in claim 2 in which the projection on the tire wall consists of a separate element secured to the wall and forming a pocket therewith to receive the said means.

4. A device for indicating deflation of pneumatic tires on vehicle wheels comprising a prong-like member adapted to be supported at one end on a tire wall, extending toward the wheel axis, and having means on the other end thereof positioned alongside of and spaced from the wheel, whereby the bending of the tire wall when the tire is deflated will cause the said means to strike the wheel to give out an audible signal.

5. Apparatus for indicating deflation of pneumatic tires on vehicle wheels comprising means carried by the tire wall and extending inwardly of the tire, and a sound producing device carried by said means in close proximity to the wheel rim when the tire is properly inflated, whereby the bending of the tire wall when the tire is deflated will cause the said means to strike the wheel to give out an audible signal.

6. A device for indicating deflation of pneumatic tires on vehicle wheels comprising means carried by the tire wall and extending to a point slightly spaced from and alongside a portion of the wheel when the tire is properly inflated, whereby the bending of the tire wall when the tire is deflated will cause the said means to strike the wheel to give out an audible signal, a portion of said means being resilient to increase the sensitiveness of the device in responding to tire deflation.

In testimony whereof he hereunto affixes his signature.

HAGBART SYLVESTER CHRISTOPHERSEN.